United States Patent
Binzaid

(10) Patent No.: US 12,078,388 B2
(45) Date of Patent: Sep. 3, 2024

(54) SYSTEM FOR AMPLIFYING SOLAR HEAT FOR CONCENTRATED SOLAR-THERMAL POWER SYSTEMS

(71) Applicant: The Texas A&M University System, College Station, TX (US)

(72) Inventor: Shuza Binzaid, San Antonio, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 63 days.

(21) Appl. No.: 17/029,881

(22) Filed: Sep. 23, 2020

(65) Prior Publication Data

US 2021/0088253 A1 Mar. 25, 2021

Related U.S. Application Data

(60) Provisional application No. 62/904,474, filed on Sep. 23, 2019.

(51) Int. Cl.
| | |
|---|---|
| *F24S 10/95* | (2018.01) |
| *F01K 27/00* | (2006.01) |
| *F24S 10/25* | (2018.01) |
| *F24S 10/40* | (2018.01) |
| *F24S 23/74* | (2018.01) |

(52) U.S. Cl.
CPC .............. *F24S 10/95* (2018.05); *F01K 27/00* (2013.01); *F24S 10/25* (2018.05); *F24S 10/45* (2018.05); *F24S 23/74* (2018.05)

(58) Field of Classification Search
CPC .. F24S 10/95; F24S 10/25; F24S 23/74; F24S 10/45

USPC ....... 126/569, 651, 652, 657, 692, 693, 694, 126/695, 655
See application file for complete search history.

(56) References Cited

U.S. PATENT DOCUMENTS

| | | | | |
|---|---|---|---|---|
| 4,173,214 A * | 11/1979 | Fattor | ...................... | F24S 50/80 |
| | | | | 126/690 |
| 4,922,088 A * | 5/1990 | Kasuya | ................. | G01S 3/7861 |
| | | | | 126/576 |
| 7,950,387 B2 * | 5/2011 | Kimura | ................. | F24S 23/745 |
| | | | | 126/684 |
| 2002/0002972 A1 * | 1/2002 | Blake | ...................... | F24S 25/10 |
| | | | | 126/701 |
| 2010/0206296 A1 * | 8/2010 | Matalon | ................ | F24S 30/425 |
| | | | | 126/694 |
| 2015/0191959 A1 * | 7/2015 | Schmohl | ................... | E06B 9/26 |
| | | | | 160/6 |

* cited by examiner

*Primary Examiner* — Vivek K Shirsat
(74) *Attorney, Agent, or Firm* — Jackson Walker LLP; Leisa Talbert Peschel

(57) ABSTRACT

A system for enhancing overall energy production of CSPs through amplification of solar heat collection. In one embodiment, the system comprises a linear solar-thermal concentrator for concentrating solar light comprising a curved surface, two side walls, and an opening; a fluid conduit disposed within the linear solar-thermal concentrator that carries a working fluid through the linear solar-thermal concentrator; and a convection cover disposed over the opening of the linear thermal concentrator that traps heat convection energy within the linear solar-thermal concentrator.

10 Claims, 12 Drawing Sheets

SYSTEM FOR AMPLIFYING SOLAR HEAT FOR CONCENTRATED SOLAR-THERMAL POWER SYSTEMS

CROSS-REFERENCE TO RELATED APPLICATIONS

This application is a Non-Provisional application which claims the benefit of U.S. Provisional Application Ser. No. 62/904,474 filed Sep. 23, 2019, the disclosure of which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

The present invention relates to the field of renewable energy generation through concentrated solar-thermal power systems (CSPs). More particularly, the present invention relates to a system that enhances energy production of existing commercial CSPs through the amplification of solar heat collection.

Background of the Invention

Concentrated solar-thermal power systems (CSPs) are systems that generate solar power through the use of mirrors or lenses that concentrate a large area of sunlight onto a smaller area receiver such that the sunlight is converted into solar-thermal energy (i.e., heat). This heat can then be used to create steam to drive a turbine connected to a generator, thus producing electrical power. In the industry, there are various CSP technologies, including the parabolic trough, dish, concentrating linear Fresnel reflector, and power tower systems. Parabolic trough and concentrating linear Fresnel reflector systems are classified as linear focus collector types while dish and power tower systems are classified as point focus types. Currently, these existing commercial CSPs present major technical drawbacks such as, without limitation, convection heat losses, low energy collection efficiency, and high construction costs.

Consequently, there is a need in the art for a system that addresses the limitations of existing commercial CSPs by enhancing overall energy production of the CSPs through amplification of solar heat collection.

BRIEF SUMMARY OF SOME OF THE PREFERRED EMBODIMENTS

These and other needs in the art are addressed in one embodiment by an apparatus for CSP systems comprising a linear solar-thermal concentrator for concentrating solar light comprising a curved surface, two side walls, and an opening; a fluid conduit disposed within the linear solar-thermal concentrator that carries a working fluid through the linear solar-thermal concentrator; and a convection cover disposed over the opening of the linear thermal concentrator that traps heat convection energy within the linear solar-thermal concentrator.

These and other needs in the art are addressed in one embodiment by a method for generating electrical power comprising providing a working fluid; passing the working fluid via a fluid conduit through a linear solar-thermal concentrator comprising a curved surface, two side walls, and an opening, wherein the opening is covered by a convection cover, wherein the convection cover traps heat convection energy within the linear solar-thermal concentrator; heating the working fluid via the linear solar-thermal concentrator; and directing the heated working fluid into a power generator.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
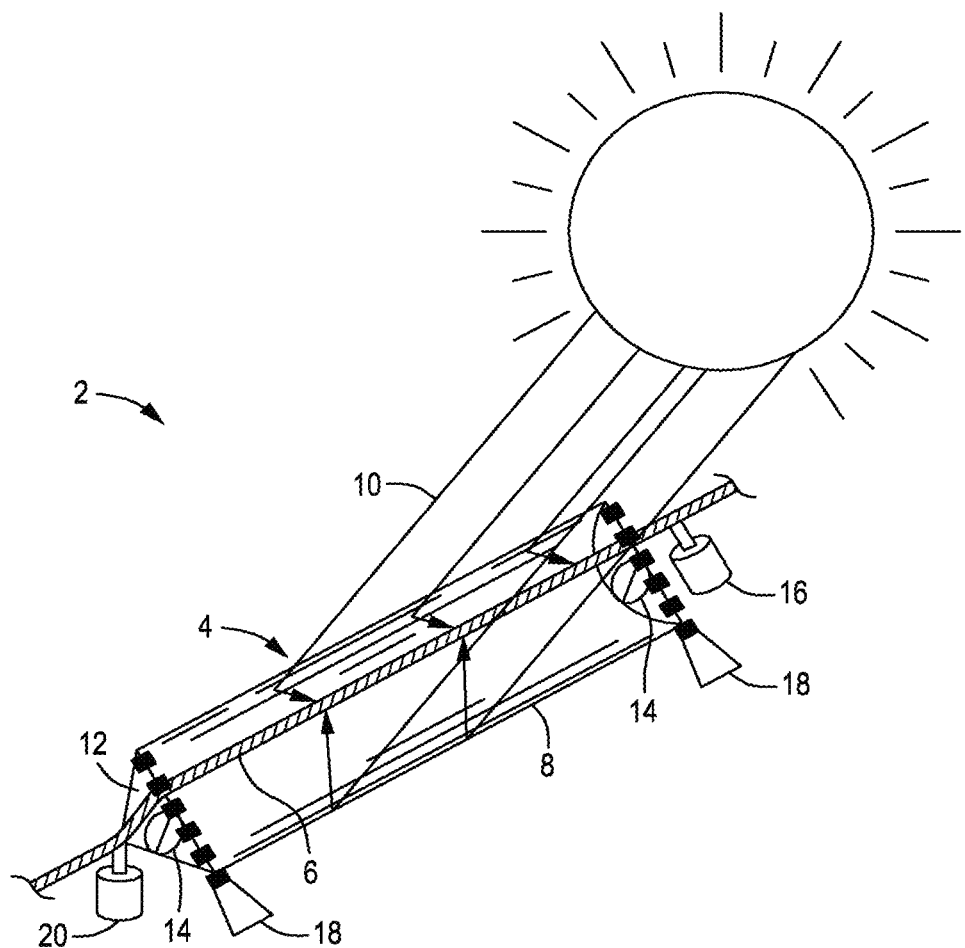
FIG. 1 illustrates a perspective view of a CSP heat amplification system in accordance with an embodiment of the present invention.

FIG. 1 illustrates an embodiment of a CSP heat amplification system 2 capable of enhancing energy production in existing commercial CSP systems (i.e., a linear CSP system). CSP heat amplification system 2 may be equipped with advanced computation capabilities and small program-based electromechanical controlling features that may enable the system to manage and maintain safety despite the enhanced energy production. In embodiments, CSP heat amplification system 2 may comprise a linear solar-thermal concentrator 4, a fluid conduit 6, and a convection cover 8.

Linear solar-thermal concentrator 4 may be a trough-shaped structure capable of concentrating solar light 10 within CSP heat amplification system 2. Linear solar-thermal concentrator 4 may comprise a curved surface, two side walls, and an opening. In embodiments, the curved surface may be a parabolically-shaped mirror 12 tuned and/or formed by an operator to concentrate solar light 10 along a desired focal line via reflection. In embodiments, an operator may take advantage of the focal, or non-focal plane. In embodiments, fluid conduit 6 may be positioned along this focal line within linear solar-thermal concentrator 4 to allow for concentrated solar light 10 to heat fluid conduit 6. In order to maximize concentrated solar light 10, linear solar-thermal concentrator 4 may be fixed along a single axis that allows for radially movement to track the sun as it travels east to west. In embodiments, fluid conduit 6 may be positioned along the focal line via a plurality of lifter motors 18. One lifter motor 18 may be disposed at either end of CSP heat amplification system 2 outside of linear solar-thermal concentrator 4, such that each lifter motor 18 may be connected to fluid conduit 6.

Fluid conduit 6 may be a heat absorbent tubing suitable for carrying a working fluid through linear solar-thermal concentrator 4. As such, concentrated solar light 10 may heat the working fluid that flows through fluid conduit 6. In embodiments, fluid conduit 6 may be made up of various materials comprising, glass, metal (e.g. iron, copper, steel, stainless steel, brass, and aluminum), or any combinations thereof. Further, fluid conduit 6 may be a single or layered tubing arrangement. The design and materials used for fluid conduit 6 may be well known in the art. In embodiments, the working fluid carried by fluid conduit 6 may be any fluid capable of heat transfer such as, without limitation, water, oil, liquified salts, or any combinations thereof. In embodiments, the working fluid may be pumped through fluid conduit 6 via fluid pump 20. Once the working fluid has been heated by concentrated solar light 10, a CSP system may utilize the fluid to generate electrical power.

In embodiments, the energy production of a CSP system may be directly correlated to the solar heat collection process of heating the working fluid in fluid conduit 6 via concentrated solar light 10. Therefore, enhancing energy production of a CSP system may occur by amplifying the solar heat collection process. In embodiments, amplification of solar heat collection may be accomplished by utilizing convection cover 8. Convection cover 8 may be a structure designed to cover the opening of linear solar-thermal concentrator 4 such that fluid conduit 6 may be fully enclosed by linear solar-concentrator 4. In embodiments, convection cover 8 may be fabricated from tolerant, multi-pane, high temperature, light, transparent materials, or any combinations thereof. For example, convection cover 8 may be, without limitation, glass. These materials may make convection cover 8 more heat insulated. By fully covering the opening, convection cover 8 may protect the system from various weather effects, thereby reducing maintenance cost significantly. Additionally, heat convection energy, which is typically lost in current CSPs, may get trapped within linear solar-thermal concentrator 4, and therefore be effectively utilized for increasing the temperature within the concentrator. In embodiments, energy generation of a CSP system making use of CSP heat amplification system 2 may be improved by at least about 10% to about 30%, or alternatively by at least about 15% to about 20%. In some embodiments, in order to make the heat convection process even more effective, a good insulator may be place on the outside of mirror 12.

In embodiments, CSP heat amplification system 2 may further comprise, temperature sensors, pressure sensors, a plurality of fans 14, and a release valve 16 to aid in managing and maintaining safety of the system despite the enhancement in energy production. For instance, an operator may monitor the temperature within CSP heat amplification system 2 using the temperature sensors to prevent the system from overheating during operation. The temperature at which the system may be overheating may depend on the working fluid being carried by fluid conduit 6. For embodiments in which the working fluid is water, the overheating temperature may be about 200° F. or greater, and for embodiments in which the working fluid is oil, the overheating temperature may be about 400° F. or greater. Fans 14, which may be disposed in the side walls of linear solar-thermal concentrator 4, may be activated to remove trapped heat within CSP heat amplification system 2. Further, fans 14 may be activated at variable speeds depending on the amount of trapped heat that needs to be removed. In addition to temperature, an operator may monitor the pressure within CSP heat amplification system 2 using the pressure sensors to prevent the system from becoming over pressurized during operation. The pressure at which the system may be over pressurized may be contingent upon the system's mechanical pressure tolerance supplied by the manufacturer. Release valve 16, which may be disposed in-line with fluid conduit 6, may be activated to release a desire amount of pressure from within CSP heat amplification system 2. In embodiments, the temperature sensors, the pressure sensors, fans 14, and release valve 16 may be monitored and controlled via smart electronics comprising a microcontroller system. In embodiments, if CSP heat amplification system 2 is placed in a remote location, then a small solar panel may be used to provide energy for these components (i.e. the fans) and the smart electronics which may require less than 25 Watts for a system that collects about 2 KW of solar energy. Additionally, lifter motors 18 and fluid pump 20 may also be monitored and controlled via the smart electronics.

Figure 2:
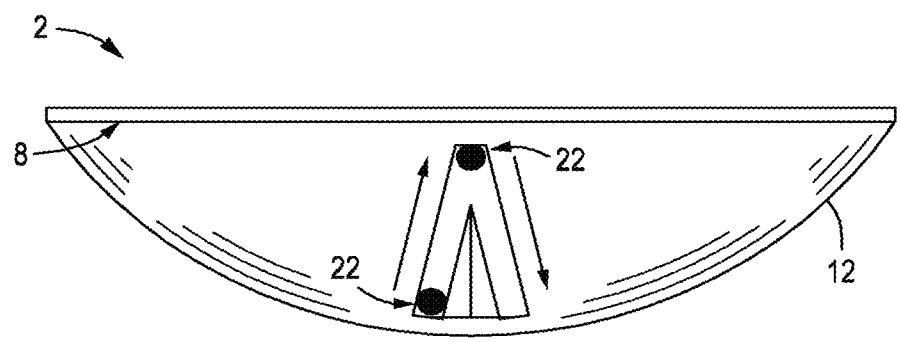
FIG. 2 illustrates a cross-sectional view of CSP heat amplification system simultaneously making use of two separate working fluids in accordance with an embodiment of the present invention.

FIG. 2 illustrates an alternative embodiment in which CSP heat amplification system 2 comprises a plurality of fluid conduits 22. Typically, a CSP system can have only one fluid in one flow loop to store its energy. However, CSP heat amplification system 2, may accommodate two loops to store and use energy provided by two types of working fluids (i.e., water and oil). In embodiments, both fluid conduits 22 may be moved by lifter motors 18. In this case, two sets of lifter motor pairs 18 may be used for maximizing the heat collection process.

Figure 3:
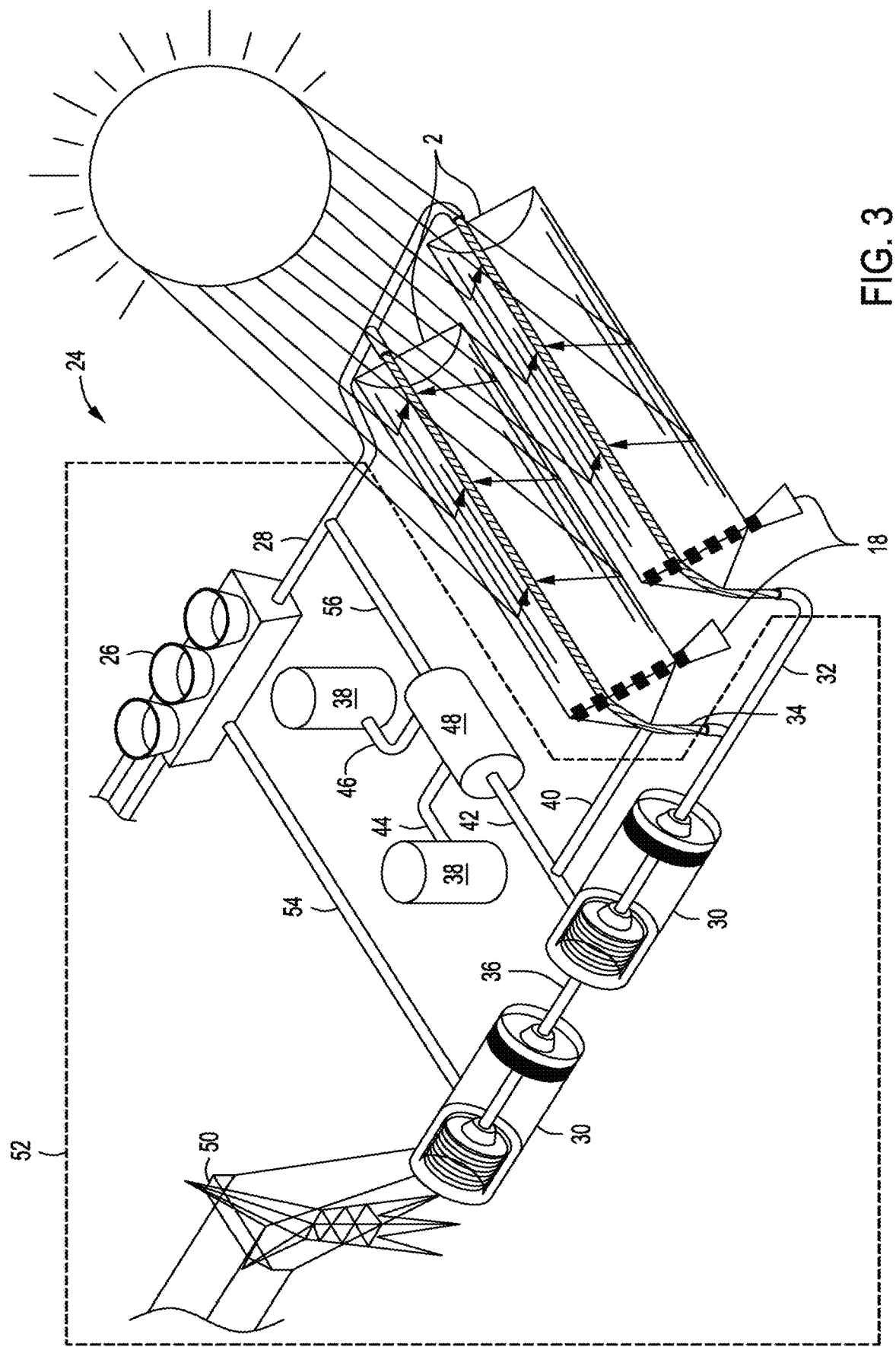
FIG. 3 illustrates a linear CSP system implementing a CSP heat amplification system in accordance with an embodiment of the present invention.

FIG. 3 illustrates an example of a linear CSP system 24 implementing CSP heat amplification system 2. More particularly, FIG. 3 illustrates an example of linear CSP system 24 implementing a plurality of CSP heat amplification systems 2. In embodiments, a portion 52 of linear CSP system 24 may simply be an application of a linear CSP system known in the art. Portion 52 may easily be replace by other CSP systems known in the art. In embodiments, a CSP system may incorporate any suitable number of CSP heat amplification systems 2. As illustrated, linear CSP system 24 may comprises a steam condenser 26 having an outlet 28 for directing the working fluid to two CSP heat amplification systems 2. In embodiments, the working fluid passing through CSP heat amplification systems 2 may be converted to steam and further be directed to one or more turbine driven electricity generators 30 via steam conduits 32, 34, and 36 to produce electricity 50. CSP heat amplification systems 2 may be used for both direct-drive steam generators and high temperature liquified salt storage. After passing through turbine driven electricity generators 30, steam may be recycled back to steam condenser 26 via conduit 54. Additionally, a portion of the steam generated may be returned to thermal storage tanks 38 via conduits 40, 42, 44, and 46, as well as via separator 48. Further, liquid from separator 48 may be recycled back to CSP heat amplification systems 2 via conduit 56. In embodiments, valves may be provided in the various conduits to control the flow of fluid within the system.

In embodiments, CSP heat amplification systems 2 may be rotatably supported by suitable supports to allow for rotation about their longitudinal axes. Radial motion motors (not illustrated) may be provided to cooperate with gears or the like disposed on CSP heat amplification systems 2 to rotate them. Further, the radial motion motors may be connected to suitable solar sensors, that may be monitored and controlled via the smart electronics, to manipulate the orientation of CSP heat amplification systems 2.

To further illustrate the benefits of implementing embodiments of the present invention, the following study is provided.

Study

A study was done for several types of CSP systems. Table 1 shows that the present invention is far better than those technologies and can easily be implemented in today's commercial systems.

TABLE 1

Comparison of CSP and an Embodiment of the Present Invention.

| Features | Solar Tower | Current Linear CSP | An Embodiment of the Present Invention |
|---|---|---|---|
| Tech complexity | Complex | Less complex | Less complex |
| Setup | Difficult focusing | Easy focusing | Autofocus |
| Land size | >2× (3500 acres) | Smaller (1500 acres) | Smaller |
| Energy produced | Lesser (126 MW) | More >15% (150 MW) | Much more >25% |
| Air heat loss @ temp | Higher >1000° C. | Less @ 600° C. | Much less/ Negligible |
| Maintenance | Very costly | Less costly <30% | Much less <50%, |
| Cost | $2.2 B | Lesser <$1.2 B | Comparable, TBD |

To further illustrate various illustrative embodiments of the present invention, the following example is provided.

Example 1

Below are two stages for finding the energy solution of the CSP. Energy saved by the convection can be at least 60 W for about 4 sq-m mirror area of solar light used for solar concentration. This is significant with regards to the total solar energy converted to heat, which is between 350 W to 450 W.

Finding the Thermal Coefficient

Assuming the non-flowing air of convection heat loss is at 600° C., the convection heat transfer co-efficiency is calculated using an algorithm developed by the US Department of Energy. In today's linear CSPs, the heat losses are more when air flows and the convection efficiency would be higher than 11.1 W/m$^2$*K. The parameters are shown as follows:

Surface Type: Cylinder (horizontal)
Diameter: 0.0254 m
Surface Temperature: 600° C.
Surround Media Temperature: 45° C.
Surrounding Media: Air
Convection Coefficient: 11.1 W/m$^2$*K Finding the Effective Reduction of Energy Losses Convective Heat Transfer is calculated using an algorithm known in the art. The parameters are shown as follows:
Surface Area: 0.00983 m$^2$ Surface Temperature: 600° C.
Air Temperature: 45° C.
Convection Coefficient: 11.1 W/m$^2$*K
Heat Transfer: 60.6 W Energy Efficiency (Gain)

The system was considered as a lab experimental setup. The concentrator is a mirror of the solar area having 2 ft×2 ft. Based on the solar energy of this CSP, it can collect 0.35 KWh-0.45 KWh of energy based on solar 1 KWh/m$^2$. Literature reviews show that the light energy concentration can be 15-80 times that of sunlight intensity. Here, it is considered as concentrated by around 40 times in this CSP for reaching a temperature to 600° C.

As noted above, the thermal calculation shows that at least 60.6 W of energy would be lost as air heat convection at 600° C. This loss of energy is a lot more for a tower CSP system which operate around at 1000° C. By containing these heat losses in the CSP, we can gain higher thermal heat transfer. Thus, the system becomes 15% more efficient than today's linear CSPs.

Prototyping and Testing

A prototype system was built in a lab experimental setup in accordance with an embodiment of the present invention. The concentrator is a mirror of the solar area having dimensions of 0.8 ft×3.17 ft (or 9.5 inch×38 inch). Based on the solar energy of this CSP, it can collect 0.426 KWh of maximum energy based on solar 1 KWh/m$^2$. Literature review shows that the light energy concentration can be 15-80 times of sunlight intensity by using such a parabolic trough (CSP). In this design, sunlight is 18.5 times concentrated for reaching temperatures to 400° F. or 204° C. while fluid is flowing in the metal heat tube. The dimension and amount of energy are related in this feature design and it can be scaled for applications based on their requirements.

Figure 4B:
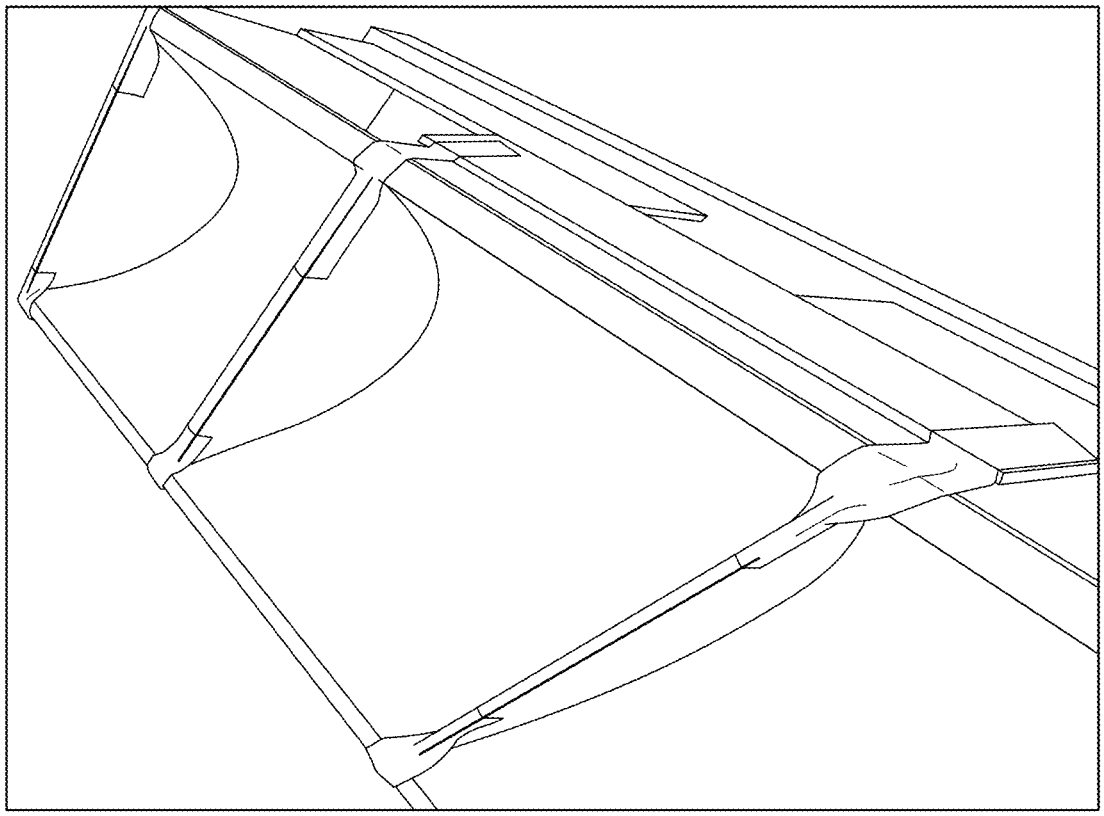
FIGS. 4A-4D illustrate construction of a CSP heat amplification system in accordance with an embodiment of the present invention.
Figure 4A:
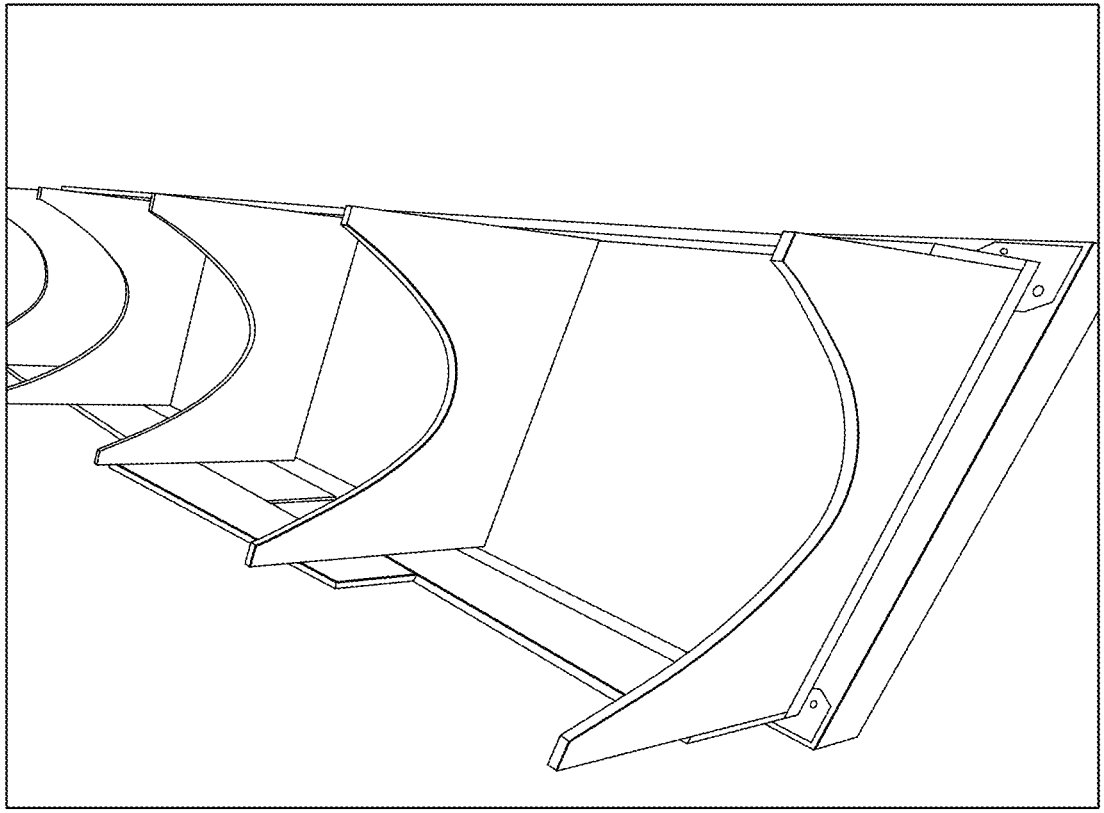
Figure 4D:
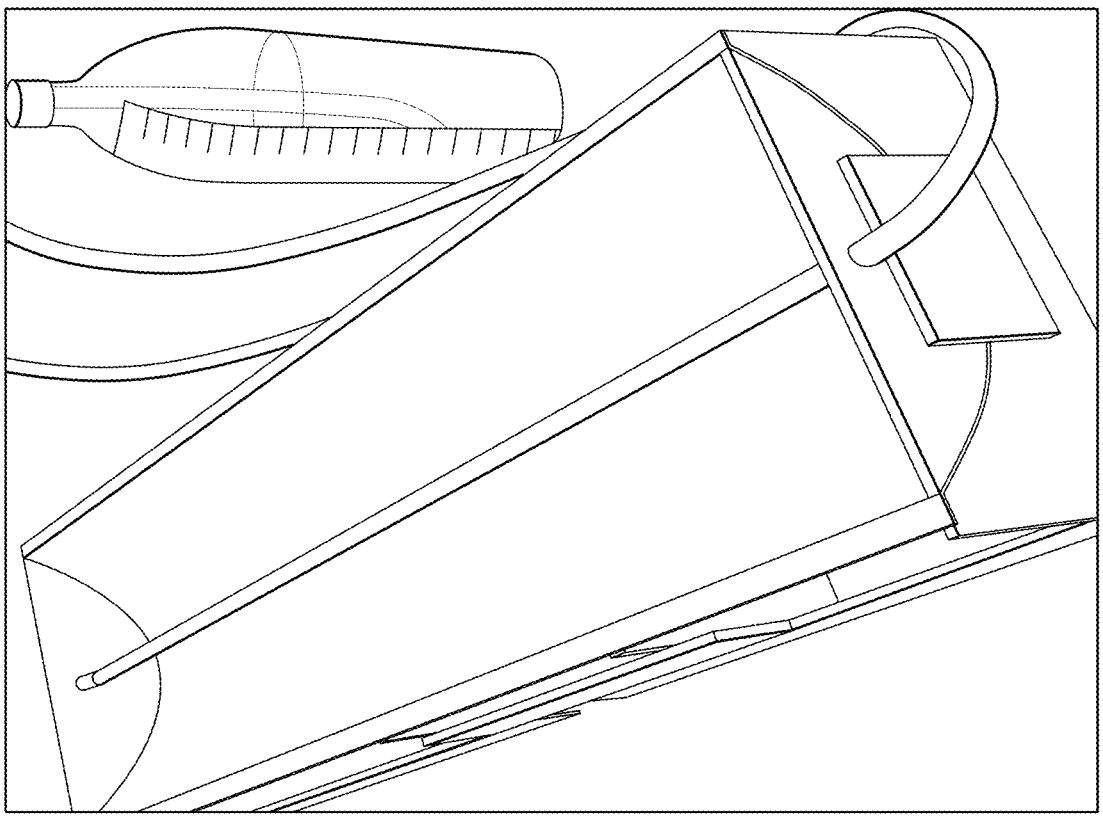
Figure 4C:
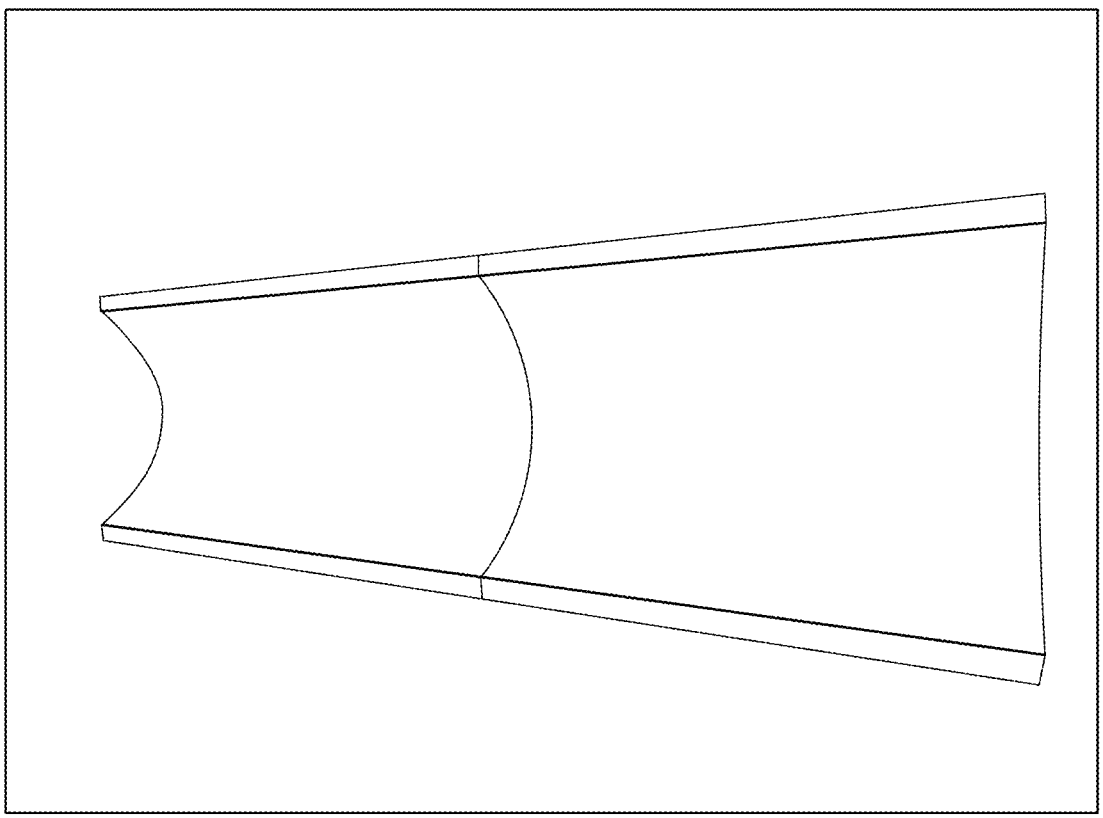

FIGS. 4A-4D illustrate construction of a prototype CSP heat amplification system in accordance with an embodiment of the present invention. More specifically, FIG. 4A illustrates a frame, FIG. 4B illustrates attaching a mirror and parabolic tuning plates on mirror, FIG. 4C illustrates a completed tuned mirror, and FIG. 4D illustrates an energy collecting black metal heat tube installed at the focal point of the linear mirror.

Figure 5B:
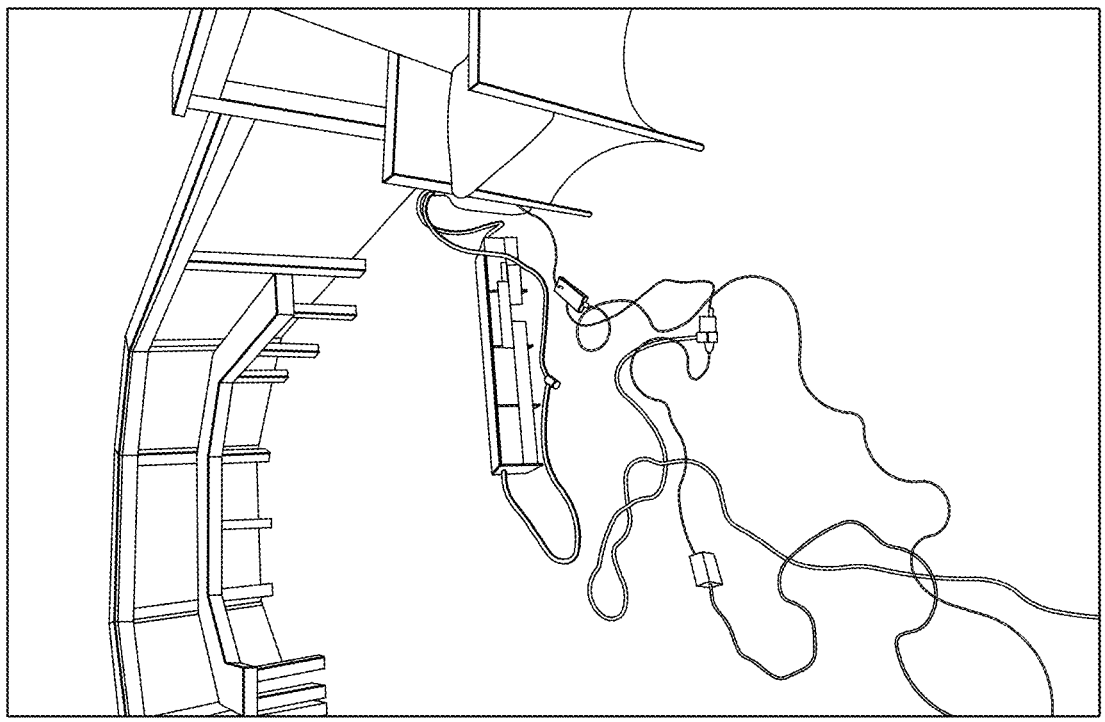
FIGS. 5A-5D illustrate assembly and verification of a CSP heat amplification system in accordance with an embodiment of the present invention.
Figure 5A:
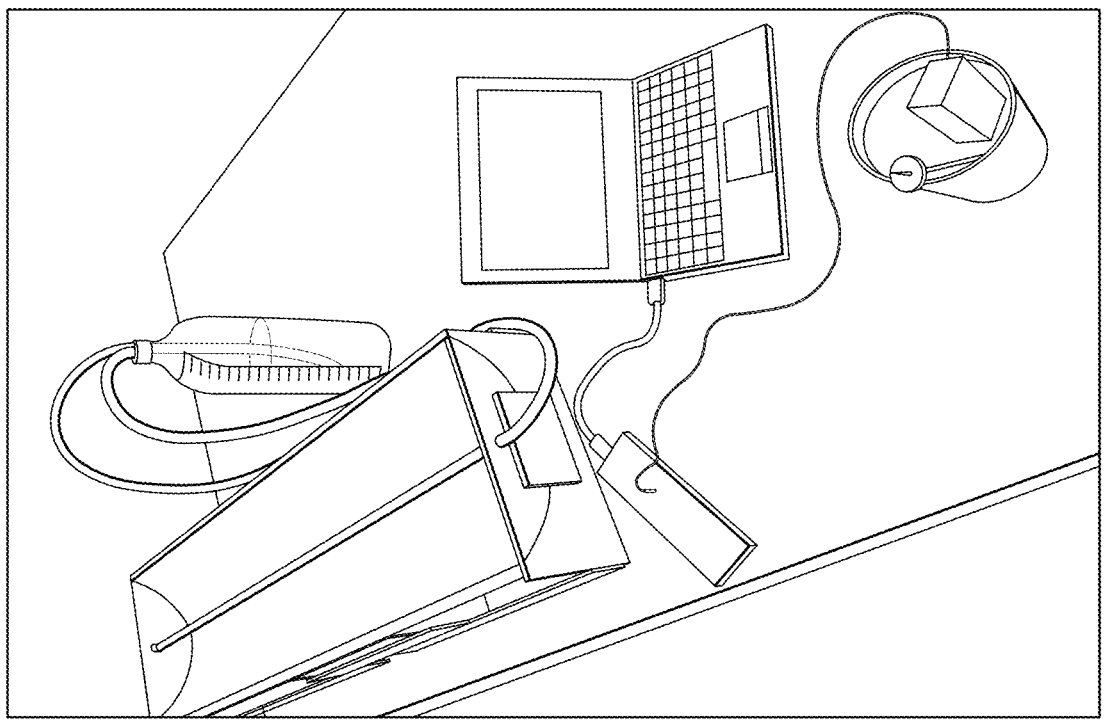
Figure 5D:
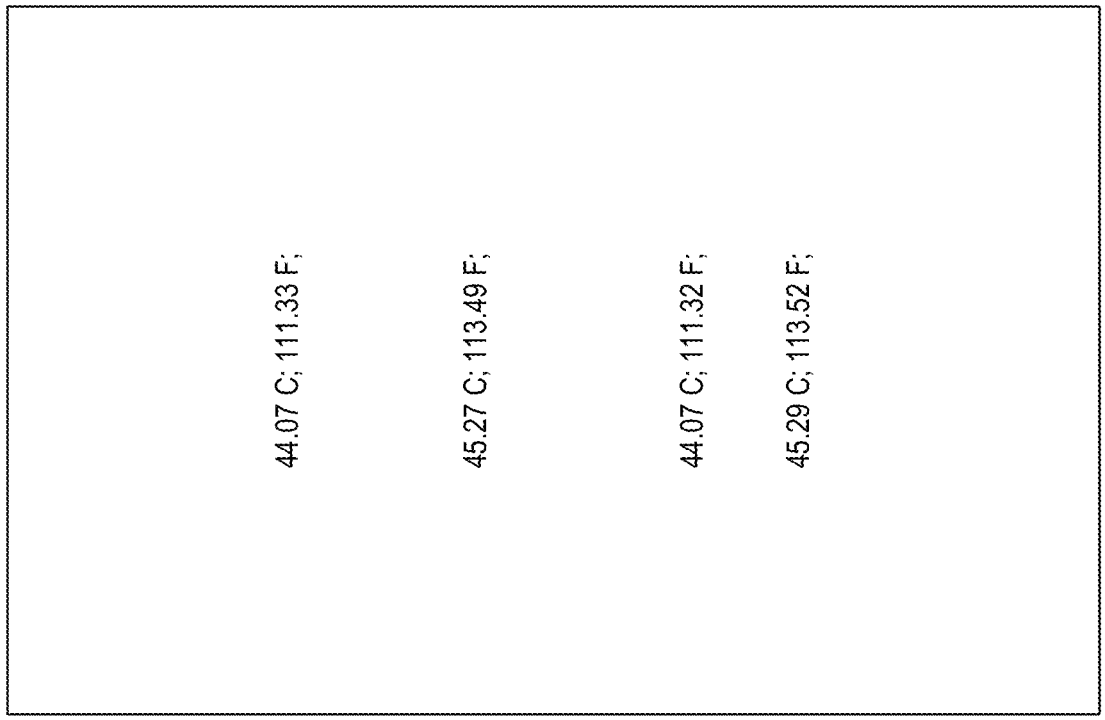
Figure 5C:
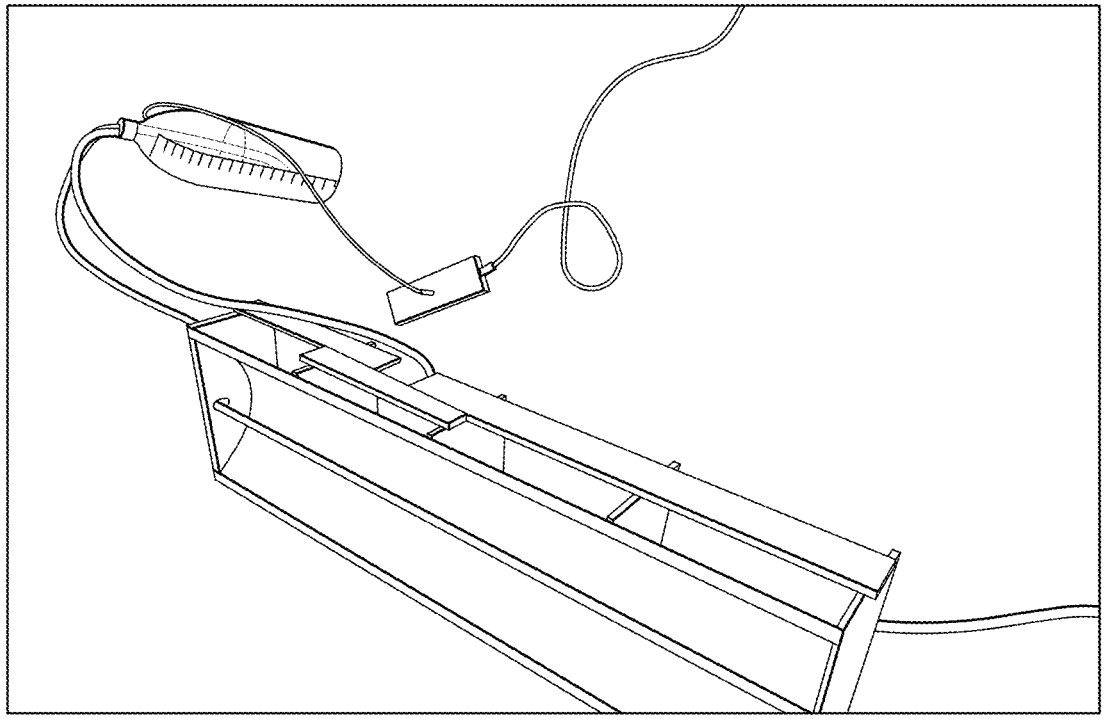

FIGS. 5A-5D illustrate assembly and verification of the prototype CSP heat amplification system in accordance with an embodiment of the present invention. More specifically, FIG. 5A illustrates in the lab, the prototype CSP heat amplification system with a microcontroller and a laptop performing calibration of temperature sensors, FIG. 5B illustrates an outdoor setup of the prototype CSP heat amplification system under sunlight, balancing temperature to 74° F. by adjusting very cold water flowing by the pump, FIG. 5C illustrates a CSP with no cover, like those commonly used, setup and collecting heat energy, and FIG. 5D illustrates a screen picture of the laptop data of increasing temperature of the cold water was reaching 111.32° F. by collecting heat energy from sunlight.

Figure 6B:
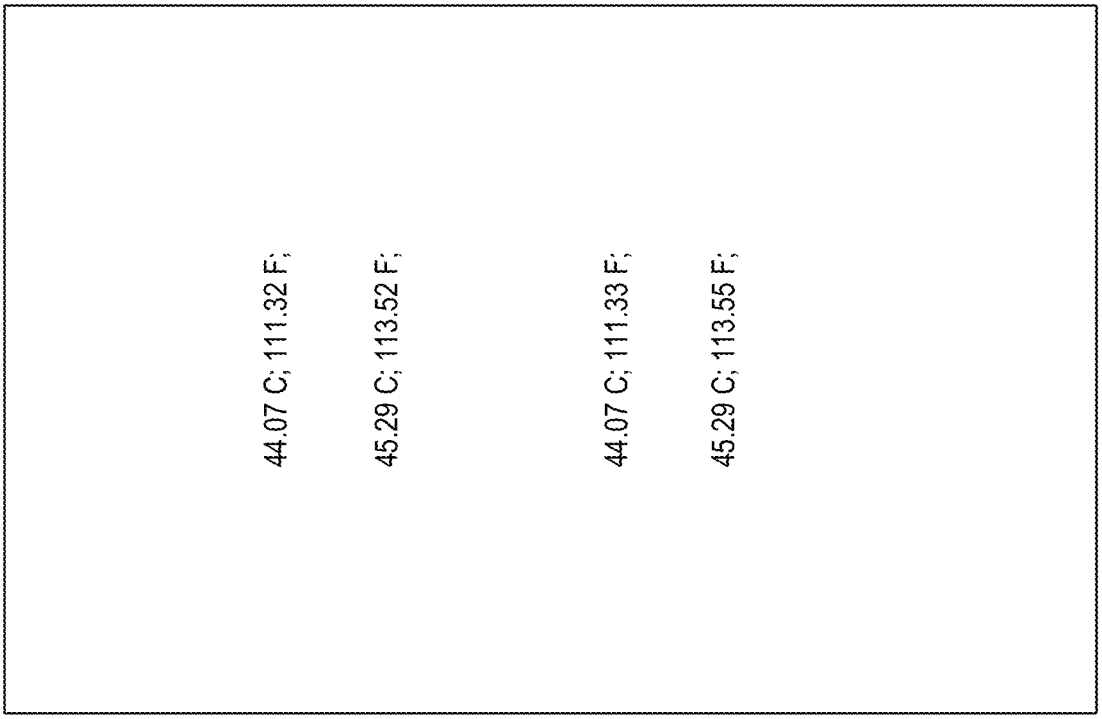
FIGS. 6A-6D illustrate an energy collection performance test of a CSP heat amplification system in accordance with an embodiment of the present invention.
Figure 6A:
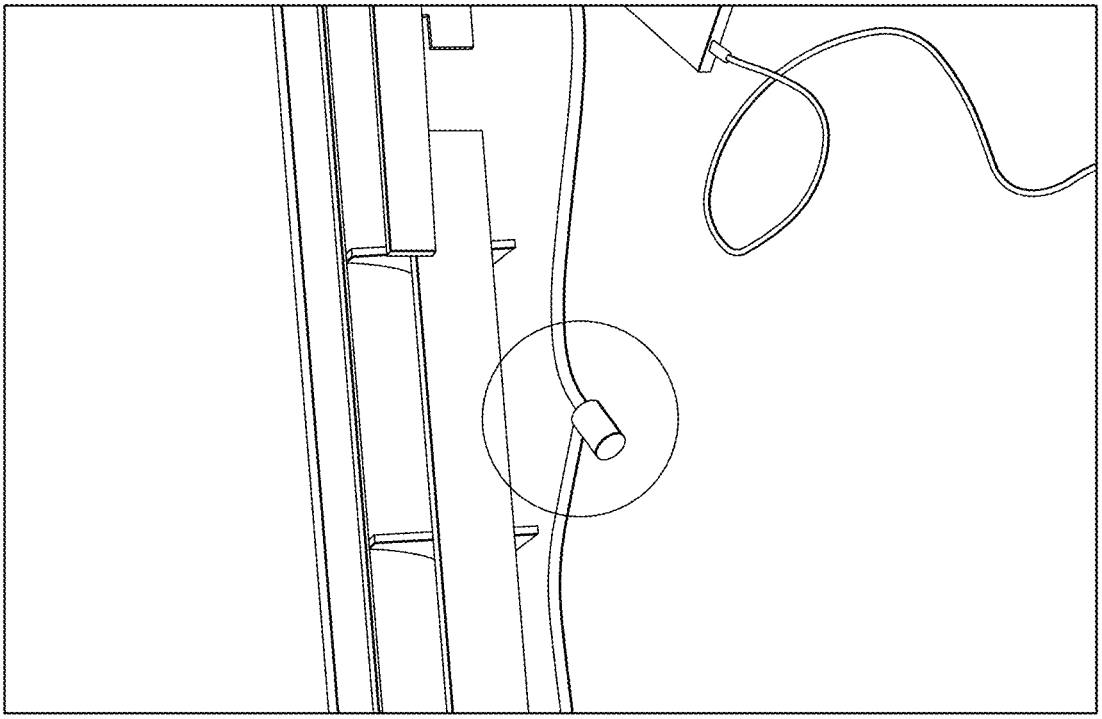
Figure 6D:
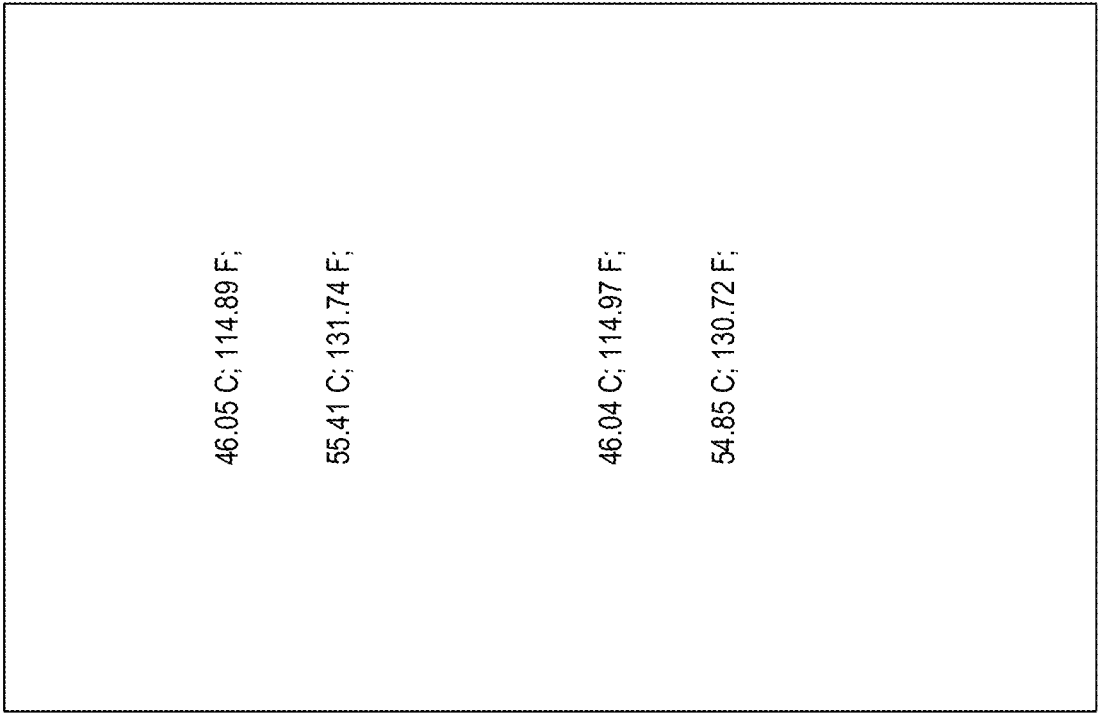
Figure 6C:
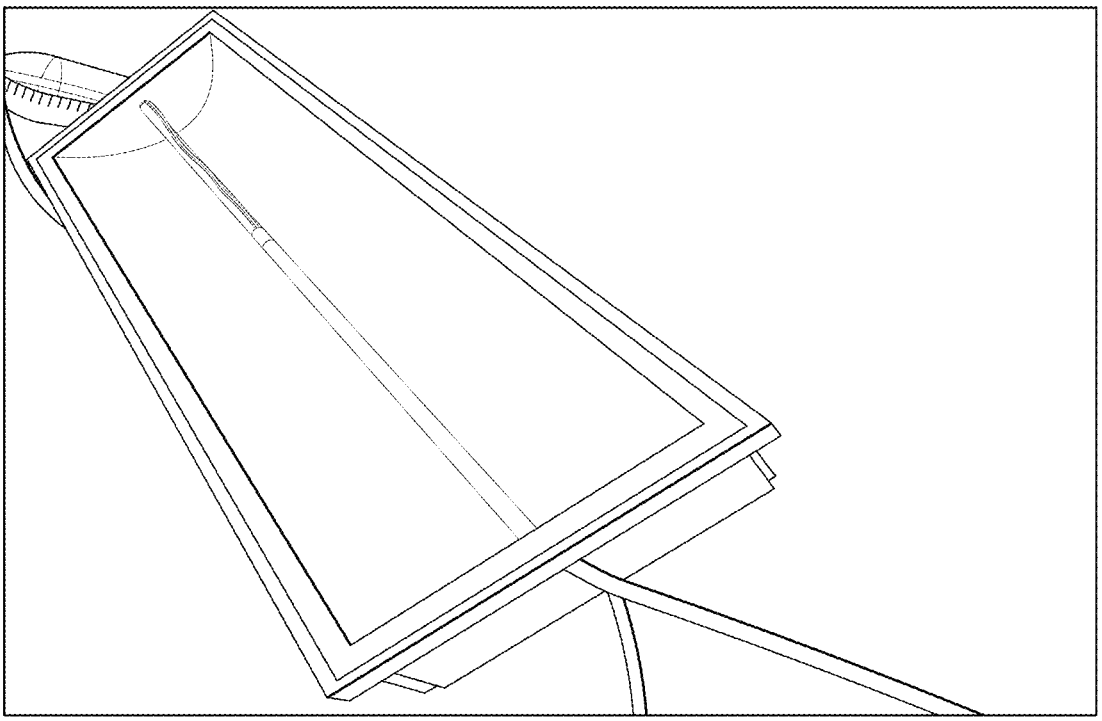

FIGS. 6A-6D illustrate an energy collection performance test of a prototype CSP heat amplification system in accordance with an embodiment of the present invention. More specifically, FIG. 6A illustrates a CSP without convection cover with the red circle showing the pump in water line which is controlled by the microcontroller's circuit, FIG. 6B illustrates a picture of the computer screen as collecting data, FIG. 6C illustrates a black framed convection cover placed on the prototype CSP heat amplification system and also shows bright light glare on the surface of the black metal heat tube, and FIG. 6D illustrates a picture of computer screen showing the increasing temperature effect in the CSP due to the trapped energy of convection heat.

Figure 7B:
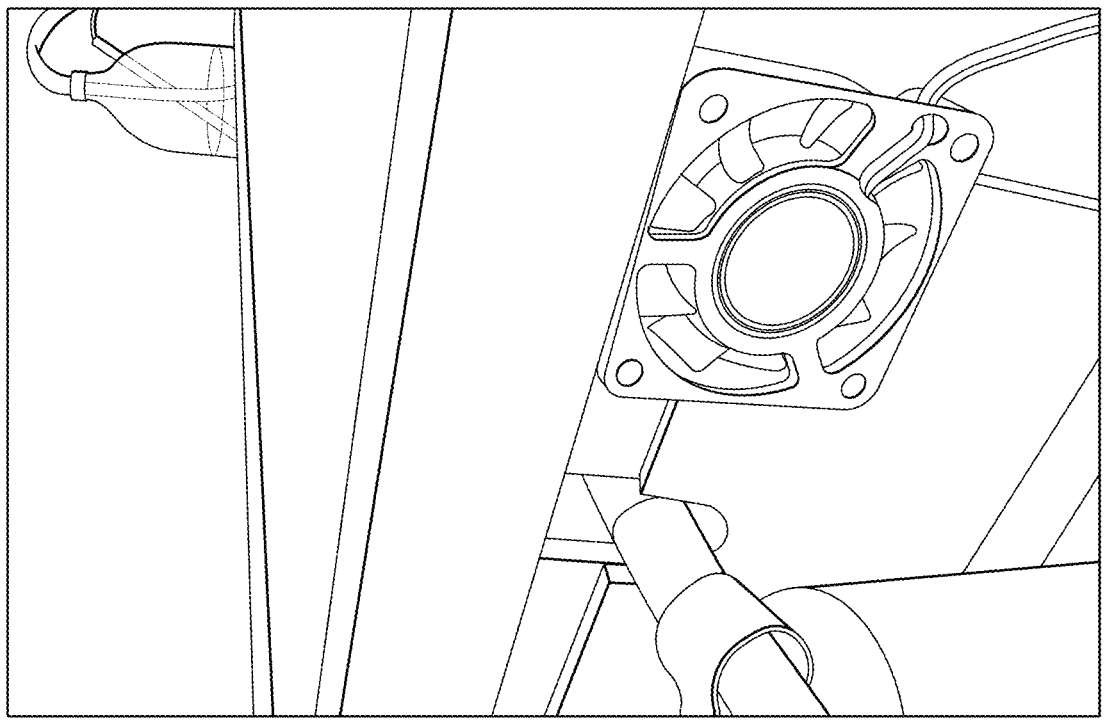
FIGS. 7A-7D illustrate an example of controlling overheating of a CSP heat amplification system in accordance with an embodiment of the present invention.
Figure 7A:
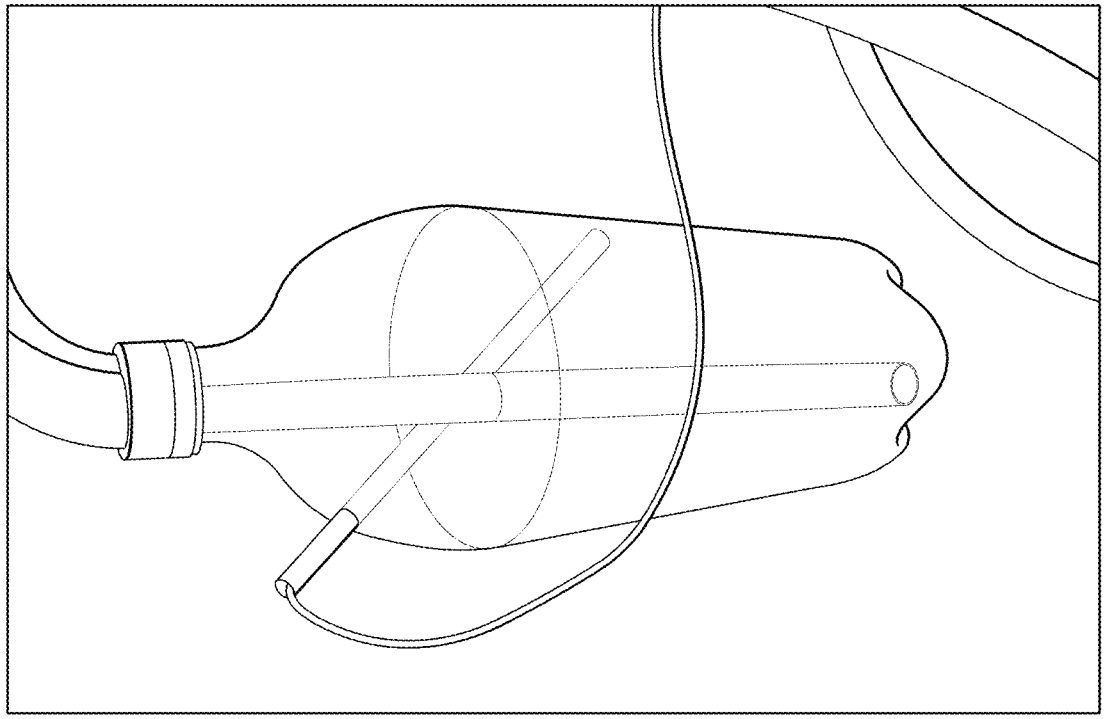
Figure 7D:
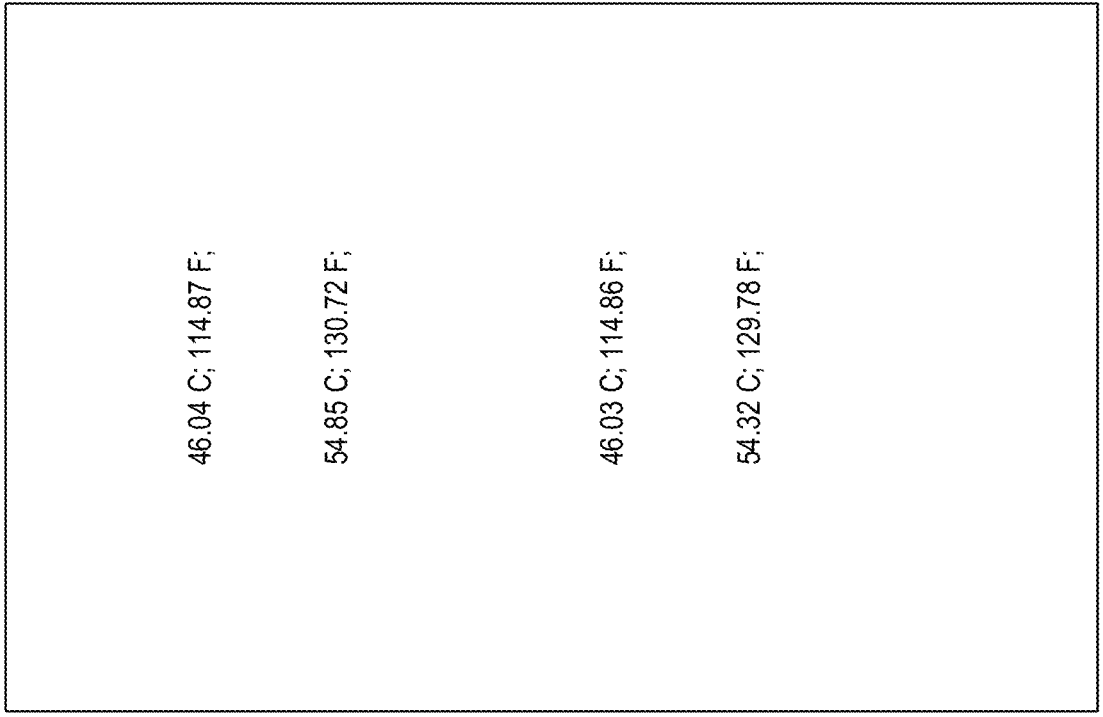
Figure 7C:
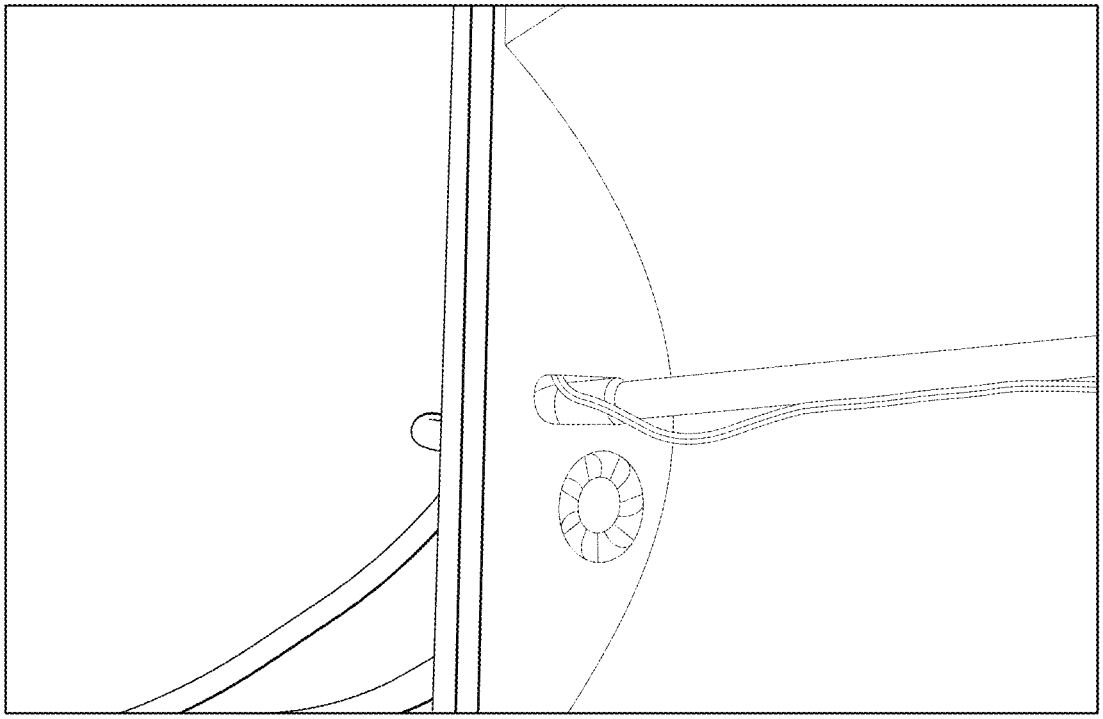

FIGS. 7A-7D illustrate an example of controlling overheating of a prototype CSP heat amplification system in accordance with an embodiment of the present invention. More specifically, FIG. 7A illustrates a water bottle receiving boiling water and showing steam in the bottle, done by user On-demand mode of microcontroller, FIG. 7B illustrates a variable speed fans on the side walls of the prototype CSP heat amplification system for controlling the overheating issues by trapped energy, FIG. 7C illustrates an inside view of the fan above the prototype CSP heat amplification system mirror, and FIG. 7D illustrates results showing the lowering temperature from 130.72° F. to 129.78° F. by fan blowing out hot, trapped air of convection heat in 5 second intervals of the controller code of data collection mode.

Figure 8B:
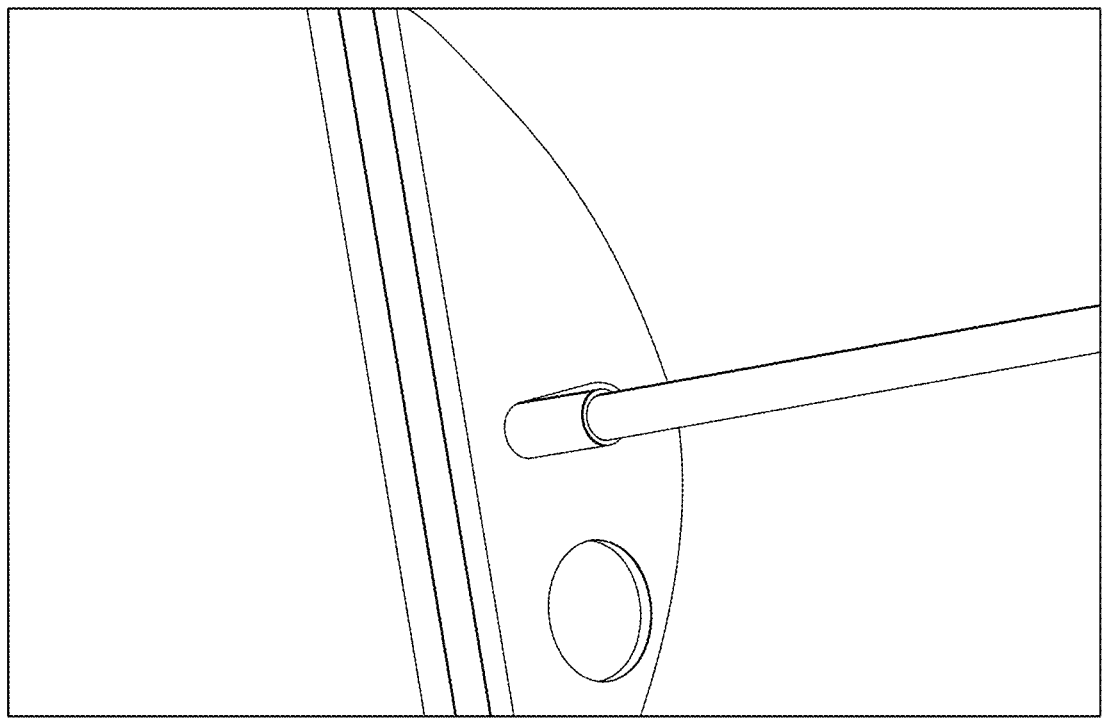
FIGS. 8A-8D illustrate an example of safe operation to control excessive heat of a CSP heat amplification system in accordance with an embodiment of the present invention when a collection requirement has already been met.
Figure 8A:
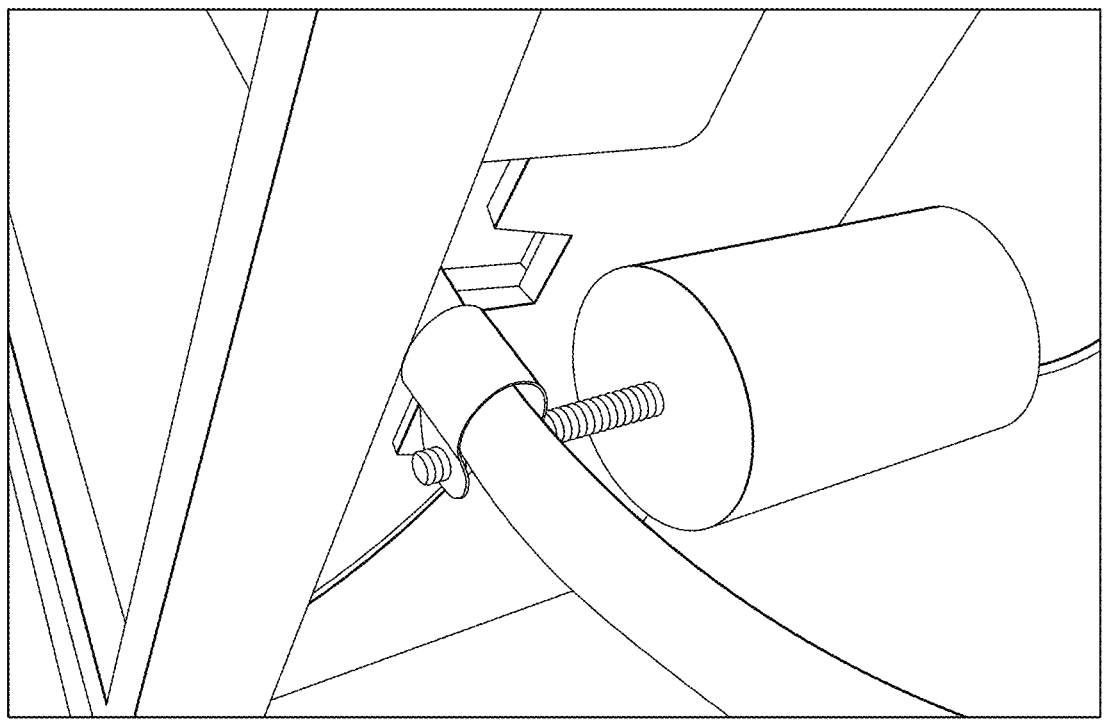
Figure 8D:
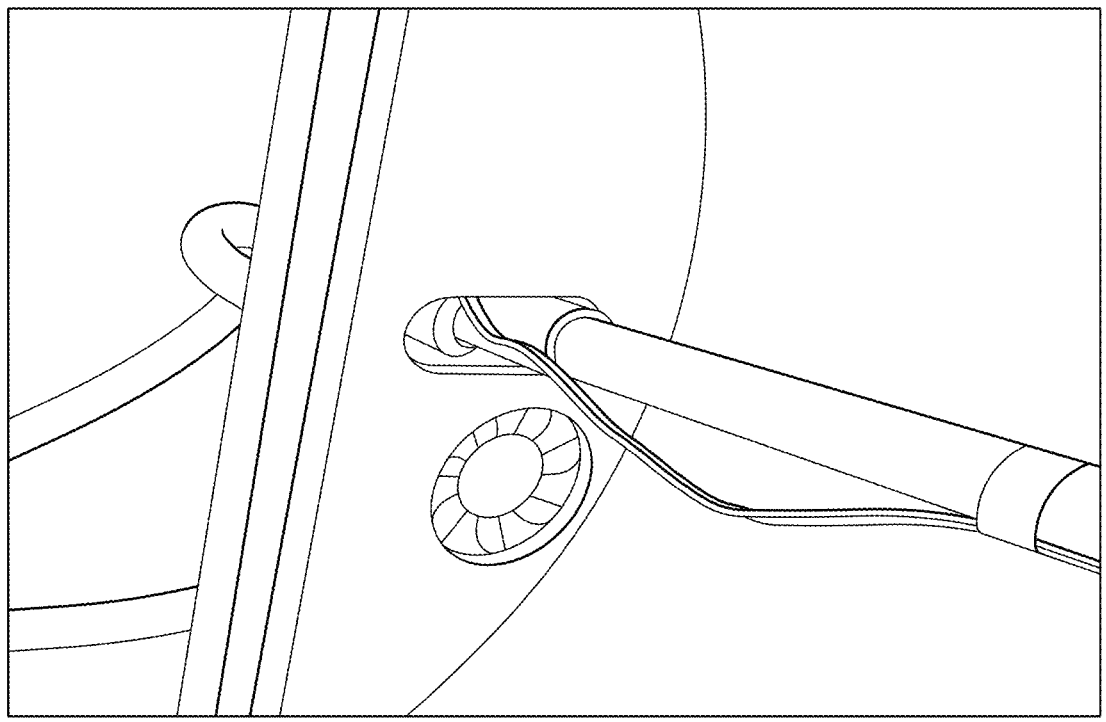
Figure 8C:
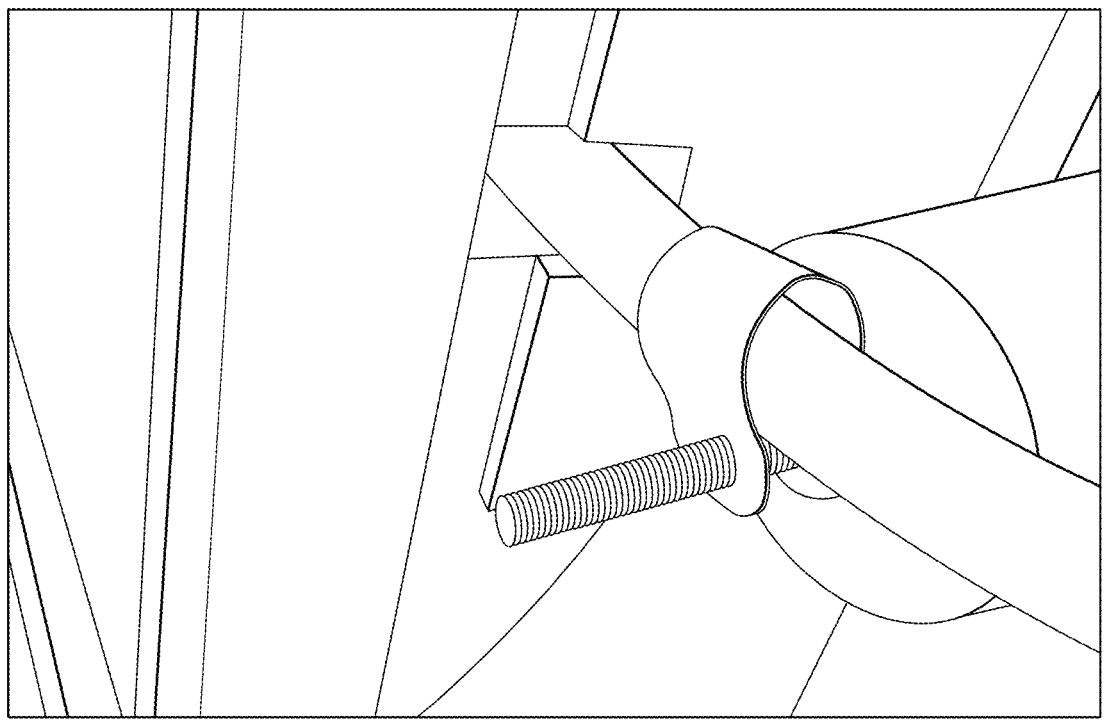

FIGS. 8A-8D illustrate an example of safe operation to control excessive heat of a prototype CSP heat amplification system in accordance with an embodiment of the present invention when a collection requirement has already been met. More specifically, FIG. 8A illustrates two black motors used with rotating lifters on both sides of the CSP wall, showing here one side of the heat tube at high position at parabolic focal point of the prototype CSP heat amplification system, FIG. 8B illustrating an inside perspective of the CSP that heat tube is set high at focal point, FIG. 8C illustrates a motor's lifter has pulled down the heat tube causing it to be at out of focus position and let lights diffused out of the CSP when energy collection is not needed, and FIG. 8D illustrating an inside perspective of the CSP, that a heat tube is lowered and set out of the CSP's focal point, a microcontroller mode to operate safely and prevent any damage.

Modes of Operation and Result Summary

The microcontroller program code has a few sensor options including pressure sensors and release valve control, temperature sensors and heat release controls. The prototype CSP heat amplification system's mode of operation, functions and the state of signals are mainly based on the energy collected and stored. Pressure sensor is very important to maintain safe operation of the system.

The logical code consists of two types fluid flow primarily that is considered here: water and oil. A system can have only one fluid in one flow loop to store its energy. In an advanced CSP heat amplification system, two loops can be accommodated to store and use on-demand at sub-200° F. for water and sub-400° F. for oil heat storage only, then usage post process of heat from oil. Both heat tube can be moved by the lifter motors. In this case two sets of lifter motor pairs can be used for maximizing the heat collection process. As previously discussed, FIG. 2 shows the function of this multi-fluid energy collection process.

Conclusion

The prototype system was built and tested under the worst conditions to prove its functionality. For example, effectiveness of convection trapping process was done while the trough did not have any insulation and let some of the heat be wasted by the mirror walls. The test showed that trapped heat was effectively raised in temperature from 114.97° F. to 130.72° F. in the system (illustrated in FIG. 7D). Thus, the system increased its efficiency by 13.6% even with the loss of heat energy by the non-insulated mirror surface.

Further analysis was done from the collected data. The results from the experimental data for the effective heat energy of the prototype are shown below. It was due to some uneven and off-focus points of the mirror and no insulation to better trapping of the energy. It produced 310 Wh instead of 426 Wh that was expected in a perfect system. A commercial linear CSP was studied and compared in this work. An innovative technique of this solution of a CSP heat amplification system has found to improve the CSP and analysis show that a good design and fabricated mirror can increase efficiency by at least 15%. The maintenance cost of a CSP heat amplification system is also reduced by around 50%, when compared to unlike most CSPs today. Because its advanced computerized auto focusing, the system needs no calibration and the mirror does not need frequent cleaning services. This may also be due to the convection cover technology. Furthermore, dual-fluid heat energy tubes can make the system very robust and maintain better safety and collect maximum energy to store in multi-purpose usages and achieve on-demand modes easily. The parameters used for calculating water heating power may be as follows:

Amount of Water: 2 Liters
Start Temperature: 114.97° F.
End Temperature: 130.72° F.
Time Period Available to Heat the Water: 4.1 minutes
Results: 310 Watts Although the present invention and its advantages have been described in detail, it should be understood that various changes, substitutions and alterations may be made herein without departing from the spirit and scope of the invention as defined by the appended claims.

What is claimed is:

1. A method for generating electrical power comprising:
   (A) providing a first working fluid and a second working fluid;
   (B) passing the first working fluid via a first fluid conduit through a linear solar-thermal concentrator comprising a curved surface, two side walls, and an opening, wherein the opening is covered by a convection cover, wherein the convection cover traps heat convection energy within the linear solar-thermal concentrator;
   (C) passing the second working fluid via a second fluid conduit through the linear solar-thermal concentrator;
   (D) heating the first working fluid via the linear solar-thermal concentrator;
   (E) heating the second working fluid via the linear solar-thermal concentrator;
   (F) adjusting the flow of the first working fluid through the linear solar-thermal concentrator to manage the temperature of the first working fluid;
   (G) adjusting the flow of the second working fluid through the linear solar-thermal concentrator to manage the temperature of the second working fluid; and
   (H) directing at least the heated first working fluid into a power generator.

2. The method of claim 1, wherein the curved surface is a light concentrating reflective mirror.

3. The method of claim 1, further comprising tuning the curved surface to concentrate solar light in a heat conduction focal area via reflection within the linear solar-thermal concentrator.

4. The system of claim 3, wherein the heat conduction focal area has a smaller length than that of the center line of the light concentrating reflective mirror.

5. The method of claim 3, further comprising positioning at least one of the first fluid conduit or the second fluid conduit along the focal area within the linear solar-thermal concentrator via a plurality of lifting motors.

6. The method of claim 1, wherein the first working fluid is water, oil, liquefied salts, or any combinations thereof, the second working fluid is different from the first working fluid, and the second working fluid is water, oil, liquefied salts, or any combinations thereof.

7. The method of claim 1, wherein the convection cover is comprised of multiple separated transparent panes.

8. The method of claim 1, further comprising regulating the temperature elevated by convection heat within the linear solar-thermal concentrator via forced air ventilation using a plurality of fans.

9. The method of claim 1, further comprising positioning one of the first fluid conduit or the second fluid conduit along a focal area via a plurality of lifting motors within the linear solar-thermal concentrator.

10. The method of claim 1, further comprising using a microcontroller to control (i) the flow rate through each of the first fluid conduit and the second fluid conduit, (ii) forced air ventilation from the linear solar-thermal concentrator; and (iii) diffusion of solar light.

* * * * *